United States Patent
Peters

(10) Patent No.: US 7,418,599 B2
(45) Date of Patent: Aug. 26, 2008

(54) DETERRING THEFT OF MEDIA RECORDING DEVICES BY ENCRYPTING RECORDED MEDIA FILES

(75) Inventor: Mark E. Peters, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 984 days.

(21) Appl. No.: 10/161,032

(22) Filed: Jun. 3, 2002

(65) Prior Publication Data

US 2003/0226023 A1 Dec. 4, 2003

(51) Int. Cl.
- G06F 12/14 (2006.01)
- H04L 9/32 (2006.01)
- G11B 11/00 (2006.01)
- G08B 13/00 (2006.01)
- H04N 7/16 (2006.01)

(52) U.S. Cl. .............. 713/193; 360/55; 369/13.01; 726/34; 726/35; 725/25

(58) Field of Classification Search .......... 713/35, 713/193; 380/200; 725/25; 360/55; 369/13.01; 726/34–35

See application file for complete search history.

(56) References Cited

U.S. PATENT DOCUMENTS

| | | | | |
|---|---|---|---|---|
| 5,499,294 A * | 3/1996 | Friedman | | 713/179 |
| 5,751,809 A * | 5/1998 | Davis et al. | | 713/176 |
| 5,799,083 A * | 8/1998 | Brothers et al. | | 380/239 |
| 5,898,779 A * | 4/1999 | Squilla et al. | | 713/176 |
| 6,006,276 A * | 12/1999 | MacCormack et al. | | 709/253 |
| 6,587,949 B1 * | 7/2003 | Steinberg | | 713/193 |
| 6,658,135 B1 * | 12/2003 | Morito et al. | | 382/100 |
| 6,750,902 B1 * | 6/2004 | Steinberg et al. | | 348/211.3 |
| 6,937,273 B1 * | 8/2005 | Loui | | 348/220.1 |
| 7,120,252 B1 * | 10/2006 | Jones et al. | | 380/201 |
| 7,136,487 B1 * | 11/2006 | Schon et al. | | 380/229 |
| 2001/0028787 A1 * | 10/2001 | Nomura et al. | | 386/69 |
| 2002/0031352 A1 * | 3/2002 | Saito | | 396/429 |
| 2002/0056081 A1 * | 5/2002 | Morley et al. | | 725/1 |
| 2002/0178368 A1 * | 11/2002 | Yin et al. | | 713/186 |
| 2002/0184158 A1 * | 12/2002 | Tadayon et al. | | 705/54 |
| 2003/0026423 A1 * | 2/2003 | Unger et al. | | 380/217 |
| 2003/0097655 A1 * | 5/2003 | Novak | | 725/31 |
| 2003/0204738 A1 * | 10/2003 | Morgan | | 713/194 |
| 2004/0037421 A1 * | 2/2004 | Truman | | 380/200 |
| 2004/0201751 A1 * | 10/2004 | Bell et al. | | 348/231.99 |

* cited by examiner

Primary Examiner—Ayaz Sheikh
Assistant Examiner—Trang Doan
(74) Attorney, Agent, or Firm—Marcia L. Doubet; Andre M. Gibbs

(57) ABSTRACT

Techniques are disclosed for deterring theft of media recording devices. Input received from a sensor, or some portion of the input, is encrypted prior to storing a media file. A decryption key must be provided when the media file is to be played back. If the key is not provided, then the file is preferably still played back, but is played back in a degraded manner. For example, a background color or other filler may be rendered in place of the encrypted portion. Additional parts of the file may also be degraded during playback. By making the playback unpleasant for the listener/viewer, theft of the recording device will be much less desirable—yet recording can continue uninterrupted, thereby minimizing disruption to legitimate users. The disclosed techniques may also be used to deter theft of the recorded media.

27 Claims, 2 Drawing Sheets

DETERRING THEFT OF MEDIA RECORDING DEVICES BY ENCRYPTING RECORDED MEDIA FILES

BACKGROUND OF THE INVENTION

1. Field of the Invention

The present invention relates to cryptography, and deals more particularly with methods, systems, and program instructions for encrypting media files to deter theft of a media recording device.

2. Description of the Related Art

Media recording devices continue to evolve in terms of functionality and design, with a trend towards increased function and improved recording quality in smaller devices. Digital cameras, as one example, are becoming more compact while offering many useful features. Video cameras (also known as "camcorders") are another example. Until recent years, personal or consumer-grade video cameras were large, cumbersome devices that displayed real-time feedback (i.e., in the eyepiece viewer) only in grayscale; these models have now been replaced with models that are relatively small and lightweight, and which display real-time feedback in full color.

Consumer-grade digital cameras and video cameras currently sell for hundreds to thousands of dollars. Their professional counterparts may sell for tens of thousands of dollars.

As devices of this type become smaller, they become easier targets for theft; as their functionality and value increase, they become more desirable targets. Once stolen, these devices may be nearly impossible to recover and return to their rightful owners.

What is needed are theft deterrent techniques for media recording devices.

SUMMARY OF THE INVENTION

An object of the present invention is to provide theft deterrent techniques for media recording devices.

Another object of the present invention is to provide techniques for making the output of a stolen media recording device undesirable and/or unusable.

A further object of the present invention is to provide techniques for encrypting recorded media files in a lightweight manner.

Yet another object of the present invention is to encrypt media files such that the quality of a recorded file is degraded upon playback if the file is not successfully decrypted.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides systems, methods, and program instructions for encrypting media files to deter theft. In one aspect, this technique comprises: capturing input with a media recording device; encrypting at least a portion of the captured input; and recording the captured input, as encrypted, wherein the encryption causes playback of the recording to be degraded unless the encryption can successfully decrypted. The encryption may further comprise using shared key cryptography, or using public key cryptography. In the latter case, the encryption preferably further comprises using shared key cryptography to encrypt the portion of the captured input and using public key cryptography to encrypt a symmetric key value used for the shared key cryptography. The encryption is preferably performed prior to, or in conjunction with, the recording.

This aspect may further comprise playing back the recording, further comprising: decrypting the recorded input; playing back the captured input if the decrypting is successful; and playing back a distorted version of the captured input otherwise. The distorted version may comprise the captured input with some portion thereof overlaid by a garbled pattern or other substitute information.

In another aspect, the present invention provides for deterring theft of media recording devices by: capturing input with a media recording device; encrypting a portion of the captured input; and recording the captured input, including the encrypted portion, such that playback of the recording will be degraded unless the encryption can successfully decrypted. In this aspect, the encryption may use a public key to encrypt a shared key and use the shared key to encrypt the portion of the captured input. This aspect may further comprise playing back the recording, which preferably comprises: determining if a private key corresponding to the public key is available; decrypting the recording if the private key is available, and playing back a result of the decryption; and if the private key is not available, playing back that portion of the captured input which was not encrypted and playing back substitute information in place of the captured input that was encrypted.

In multiple aspects, the captured input may be an image stream, in which case the distorted version preferably comprises the captured image stream with a filler pattern displayed in some portion thereof (e.g., in the portion corresponding to the encrypted portion which was not successfully decrypted). The encrypting may also apply to at least a portion of a thumbnail version of the captured input. The captured input may be an audio stream, in which case the distorted version preferably comprises the captured audio stream with a white noise stream played for the portion which was not successfully decrypted.

The encryption may use a public key to encrypt a shared key and use the shared key to encrypt the portion of the captured input. Subsequently playing back the recording preferably further comprises: determining if a private key corresponding to the public key is available; decrypting the recording if the private key is available, and playing back a result of the decryption; and if the private key is not available, playing back that portion of the captured input which was not encrypted and playing back substitute information in place of the captured input that was encrypted. The decryption preferably further comprises: using the private key to decrypt the encrypted shared key; and using the decrypted shared key to decrypt the encrypted portion of the captured input, thereby creating the result of the decryption, wherein playing back the substitute information preferably further comprises rendering a filler pattern in place of the encrypted portion.

The private key may be stored in a key fob which, when operably connected to a device with which the playback is to be performed, makes the private key available. As another alternative, the public key may be obtained from a digital certificate, in which case the private key is associated with the public key. The public key may belong to the playback device, or to a person performing the playback on the playback device. As yet another alternative, the private key may be stored on a smart card and may be made available to the playback device by operably connecting the smart card with a smart card reader. (The decryption might optionally be performed on the smart card.) As a further alternative, the private key may be stored in a cable and may be made available to the playback device by operably connecting the cable to the device. The playback device may also be used for the capturing, encrypting, and recording of input.

The private key may be made available for playback for a limited time, after which the private key must be re-supplied in order to be available. The private key may be made available from a program used to perform the playback.

The present invention will now be described with reference to the following drawings, in which like reference numbers denote the same element throughout.

DESCRIPTION OF PREFERRED EMBODIMENTS

Figure 1:
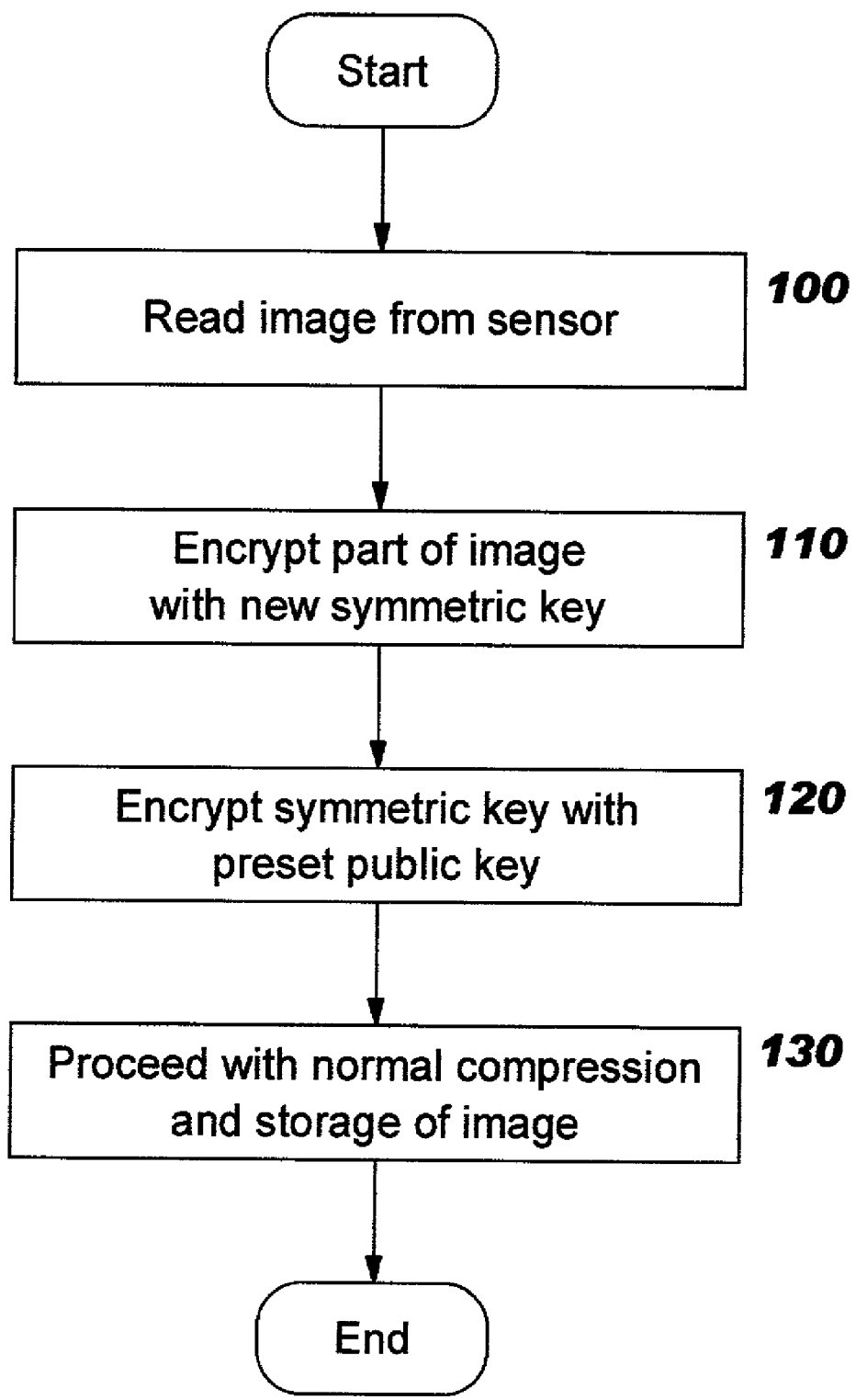
FIG. 1 provides a flowchart which sets forth logic that may be used to implement a recording process used by preferred embodiments.

The present invention defines techniques for deterring theft of media recording devices. A media file or some portion thereof is encrypted prior to or during (i.e., in conjunction with) the recording operation. According to preferred embodiments, an operator of the recording device is not required to supply a cryptographic key during the recording process. However, the recorded file cannot be played back, or cannot be played back in a quality manner, unless a decryption key is provided. Thus, theft of recording devices is deterred because the inability to play back files recorded with the devices makes the devices no longer desirable. Furthermore, the recordings created with such devices are not desirable to persons who cannot decrypt the files, and thus use of the present invention also serves as a deterrent to theft of recorded media that may be stored externally from the recording device.

Preferred embodiments are described herein with reference to media in the form of images. This is for purposes of illustration and not of limitation. The disclosed techniques may be used advantageously with other media types, including audio streams.

Encrypting a media file can be a relatively high-overhead process. Thus, preferred embodiments encrypt some portion of the file. However, embodiments which encrypt the entire file are also within the scope of the present invention.

In preferred embodiments, public key cryptography is used to encrypt all or part of a media file. In alternative embodiments, shared key cryptography may be used without public key cryptography. (Shared key cryptography is also referred to herein as use of symmetric keys.) When using public key cryptography, a public key is used for encryption, and a corresponding private key is used for decryption. Public key cryptography is well known in the art, and a detailed discussion thereof will not be presented herein. Preferably, the public key is stored on the media recording device. In one embodiment, the public key is burned into (i.e., persistently stored in) a compression chip or process used by the recording device to compress the file during the recording process. Thus, the encryption process is performed while the file is being compressed.

An example compression chip that may be leveraged in this manner is an "MPEG" chip. MPEG is an acronym for the Moving Picture Experts Group, which develops standards for compression of digital video and digital audio streams. Similarly, "JPEG" chips or processes are commonly used to compress still images, and may be leveraged in recording devices that capture still images. JPEG is an acronym for Joint Photographic Experts Group. MPEG and JPEG chips are commercially available. The manner in which chips of this type can be adapted for performing encryption (and, optionally, for performing the corresponding decryption) will be obvious once the teachings disclosed herein are known.

In alternative embodiments that protect a media file using shared key cryptography without public key cryptography, it is necessary to protect the shared key value using other means. One way in which this may be done is to require use of a password, in addition to the key. The key may be protected using a smart card. An embodiment using only shared key cryptography may be especially desirable for lower-cost devices, to avoid the added expense and computational overhead of public key cryptography.

The term "media file" is used herein to signify any type of recorded media, whether it represents a stream of data (such as that captured with a video camera) or other types of media such as a still image (captured, for example, with a digital camera).

Preferred embodiments encrypt only part of the media file, such as the very center or some random pattern through the file. Therefore, the processing load on the encryption device or component is reduced as contrasted to encrypting the entire file. In some media recording devices, more than one media file may be recorded. For example, in selected video cameras, two separate image files are recorded: one for the primary stream that will be played back later, and one for the small picture displayed in the camera's eyepiece. Similarly, in some digital cameras, the small still image displayed for local playback is recorded separately from the still image that is captured as the primary image. (The term "thumbnail" or "thumbnail sketch" is used herein to refer to the small videos or still images.) When multiple files are recorded, an implementation of the present invention preferably uses encryption to protect the content of the primary file and may optionally also protect the thumbnail file. The choice of which files to protect with encryption may be offered to a user of the recording device, or the choice may be fixed for a particular implementation of the invention.

The flowchart in FIG. 1 sets forth logic that may be used by a media recording device, according to preferred embodiments, when recording a media file. Block 100 reads an input (referred to in the figures as an image, for purposes of illustration) from a sensor, preferably using prior art techniques. Block 110 then encrypts some part of that captured input with a symmetric key which has been generated or provided for use with this image file. The symmetric key is then encrypted (Block 120), preferably using public key encryption. As discussed earlier, encrypting recorded files may result in relatively high processing overhead. Public key cryptography, in particular, is computationally expensive. Thus, preferred embodiments use the safer but more expensive public key encryption process to protect the symmetric key, rather than for the mainline encryption process.

Having encrypted both the image and the symmetric key, the image is then stored (Block 130) on some form of persistent storage. Typically, the image will be compressed prior to storage, as represented in Block 130. While shown separately in the flowchart, the encryption and compression processes may be performed in an integrated manner (for example, by a JPEG chip that is augmented to perform encryption as disclosed herein).

The encrypted symmetric key is preferably stored with the encrypted image, but alternatively may be separately stored (e.g., in a separate file). The manner in which the symmetric key used in Block 110 is obtained for encryption does not form part of the inventive concepts of the present invention. Preferably, the key is stored locally on the recording device, so that recording can continue even though a person operating the device may not know the key value. (Optionally, a password may be required to unlock the symmetric key for use during encryption.) Similarly, the manner in which the public key used in Block 120 is obtained does not form part of the inventive concepts of the present invention. Preferably, a digital certificate is stored on (or accessed from) the recording device, and the public key is retrieved from this digital certificate. The digital certificate may represent a person who is authorized to invoke the decryption process and/or a device which is authorized to perform (or invoke) the decryption process during playback.

When an implementation of the present invention is used to protect media streams, rather than still files, a looping process is added to the logic shown in FIG. 1. The manner in which the flowchart may be adapted for this looping will be readily understandable to one of ordinary skill in the art, based on the teachings disclosed herein. For example, the encrypting of the symmetric key is preferably performed only periodically, rather than continually, when iterating through the logic in FIG. 1. The advantages of changing a symmetric key value with relative frequency are known in the art. Thus, the symmetric key may be changed during the recording of a media stream, and in this case, each new encrypted key is also written to persistent storage. (An implementation of the present invention may change the symmetric key after some time period has elapsed, or after a key has been used to protect a certain number of bytes, and so forth.)

Preferred embodiments of the present invention degrade, distort, or otherwise impair the quality of a media file as it is played back, unless the file is successfully decrypted. (The term "degrade" is used herein to refer to rendering of the media file in a manner that makes playback of the files, without successful decryption, undesirable to the listener/viewer.) In the case of a video stream, this degradation preferably comprises rendering some portion of the playback in a visually unappealing manner. This portion preferably corresponds, at a minimum, to the encrypted portion of the recorded file. For example, if the center of the stream has been encrypted, then the playback may be degraded by displaying a solid color over that part of the stream, or by displaying some garbled image in that part of the stream. Alternatively, other parts of the recorded file may also be degraded during playback. Using the same example of encrypting the center of a video stream, the original content of this center portion cannot be displayed in the absence of the decryption key, as will be obvious. However, additional parts of the stream may be degraded during playback as well. A warning message might be rendered over the topmost portion of the stream, as one example. As another example, random pixels might be degraded. Or, patterns might be displayed by altering pixels in a pseudo-random manner. The degradation is preferably selected so as to make the playback unpleasant to watch, in the absence of the decryption key. When used with audio recordings, the degradation preferably comprises applying "white noise" or static to at least some portion of the audio stream.

Preferably, the entire recorded stream is not degraded. This approach makes it possible to perform some limited functions, such as on-site image validation, without possessing the decryption key. For example, a film crew can record sample footage and play that footage back locally to check lighting conditions, focus, bounding selection, and so forth, even though they do not have the decryption key and therefore cannot view a recorded media file in its intended high-quality playback form.

Figure 2:
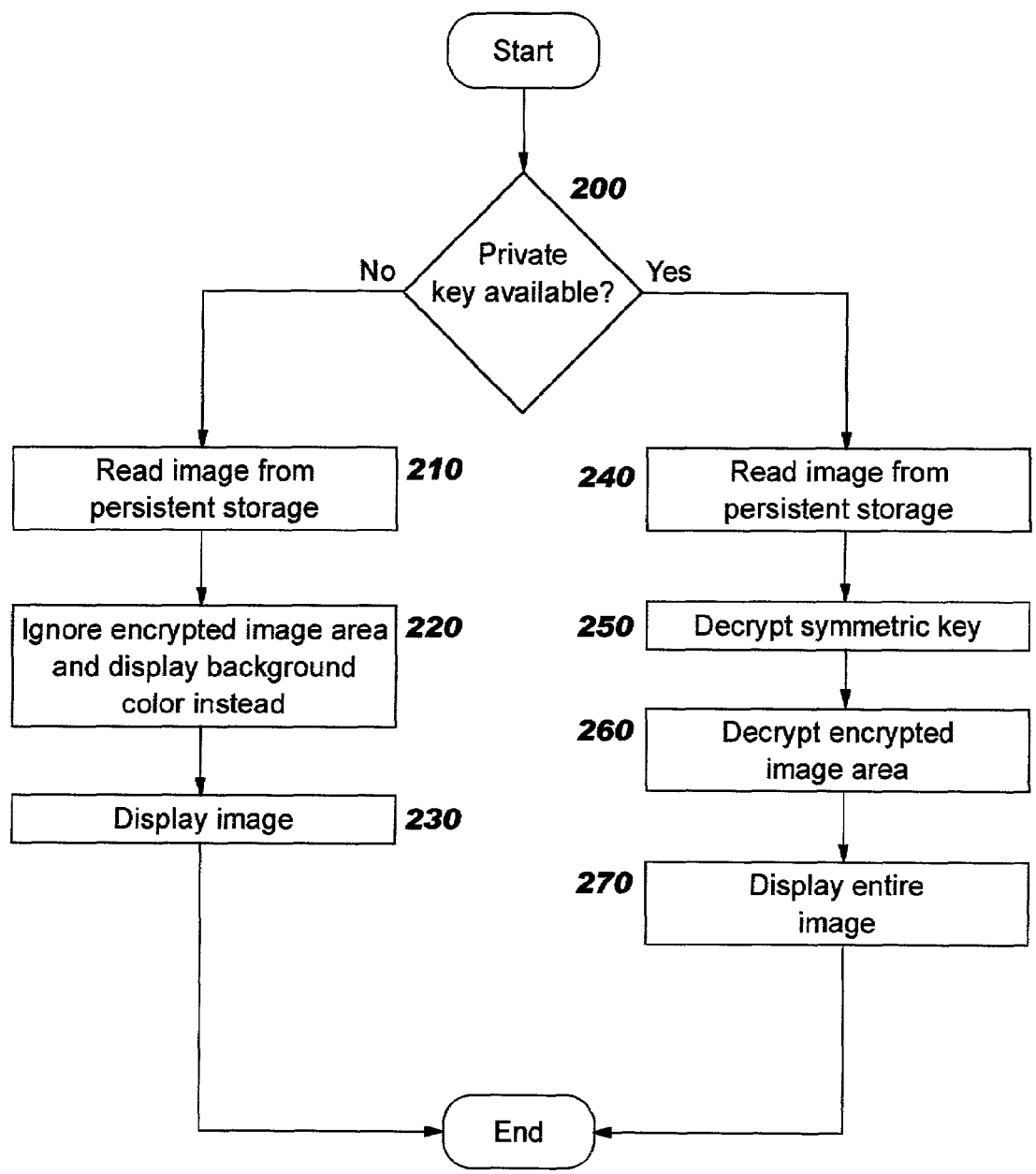
FIG. 2 provides a flowchart which sets forth logic that may be used to implement a playback process used by preferred embodiments.

FIG. 2 provides a flowchart which sets forth logic that may be used to implement a playback process used by preferred embodiments. This flowchart assumes that one or more symmetric keys were used to encrypt some portion of a recorded file, and that public key cryptography was used to encrypt the symmetric key(s). It will be obvious how this logic may be modified if shared key cryptography is used without public key cryptography.

Block 200 checks to see if the private key is available. This private key corresponds, cryptographically, to the public key used in Block 120 of FIG. 1 during encryption. If the private key is not available, then processing continues at Block 210, where the recorded image is read from persistent storage. As shown in Block 220, some type of degradation is applied in preferred embodiments to the encrypted image area (and, optionally, to additional parts of the image, as discussed above); one example is to apply a background color or other type of "filler" pattern to the image. Other examples have been described. Block 230 then displays the image, with the degradation.

If the private key is available for decryption, on the other hand, then control passes from Block 200 to Block 240. Block 240 reads the image from persistent storage, and Block 250 uses the private key to decrypt the stored (and encrypted) symmetric key. This decrypted symmetric key is then used (Block 260) to decrypt the encrypted area of the image. The entire image, corresponding to the image that was captured in Block 100, is then displayed (Block 270).

When playing back a stream, a looping process is added to the logic in FIG. 2, where this looping process corresponds to that which was discussed with reference to adapting the logic of FIG. 1 for encrypting streams. It will be obvious to one of ordinary skill in the art how the logic of FIG. 2 may be adapted for stream playback, based on the teachings disclosed herein.

The decryption process may be performed in the same device that was used for recording, if that device is used for playback. In addition, or instead, the decryption process may be performed in a separate device that is used for playback. The private key used in preferred embodiments to decrypt the symmetric key may be obtained, for example, from a smart card which is inserted into a smart card reader and transferred from this reader to the playback device. (The smart card reader may be attached to the playback device by a cable, or may be built into the device. In some embodiments, the decryption process may be performed on this smart card.) Or, the private key might be obtained from an interconnection cable which is attached to the playback device. Such cables include so-called "fire wire" cables. Key fobs are known in the art for inserting into Universal Serial Bus ("USB") ports to deliver a cryptographic key value to a device such as a laptop computer. In space-constrained devices such as small digital cameras or video cameras, it may not be practical to provide a smart card reader capability, and use of USB key fobs may be preferable for these devices. In this case, the playback device has a USB port and is adapted to expect the private key to be delivered via this port.

A user may be required to supply an additional identifier, such as a password, along with the private key.

A manufacturer could provide a key escrow service, of the type provided for keys/passwords used with laptop computers or their software. Using this type of service, the manufacturer requires a customer to provide some type of independent identification, and upon ascertaining that the correct information has been provided, the manufacturer then gives the key/password value to the customer.

Optionally, more than one user might share a key for operating a particular playback device. Or, each person may have their own key. Multiple user keys might be stored on a key ring. A single key might work for more than one playback device. A cable might be used not only to supply a decryption key, but also to perform the decryption process. A decryption key might be provided programmatically, for example by the process that performs the decryption. In this case, an additional verification is preferably performed (such as requiring a user password) to determine whether the decryption and playback operation should proceed.

An implementation of the present invention may be adapted to function only while the key is continually supplied, or alternatively, to treat receipt of the key as a type of "initialization" process after which decryption can continue even though the key is no longer supplied.

If a private key is stored in a cable or other mechanism which can itself be stolen, then a thief may be able to gain access to the stored media content by connecting this cable or other mechanism (or by stealing a device which has already been initialized with the proper decryption key). Thus, an implementation of the present invention may use a timer-driven approach (or, alternatively, an event-driven approach) whereby access is granted for a limited duration, after which additional validation must be provided. For example, after a private key has been supplied to a playback process, playback might continue for a limited amount of time such as 10 minutes. At the end of the time period, a user would be required to supply a password or other identifier which could be used to determine whether access should continue. As another example, an event such as disconnecting a cable which supplies the private key, or powering off the playback device, might be used as a trigger to require the user to supply a password or other identifier for use in determining whether that user should have continued access. An implementation of the present invention may be adapted for use with timer-driven and/or event-driven validation. Preferably, this adaptation is fixed rather than user-configurable, to reduce the likelihood of unauthorized alteration.

As has been demonstrated, the present invention provides inventive techniques for deterring theft of media recording devices. The disclosed techniques may also be used to deter theft of the recorded media files produced from such devices. Recording with a media device which implements the present invention is not hampered, according to preferred embodiments. Instead, decryption keys are not required until the recorded files are to be played back. This approach incurs minimal disruption for legitimate users of media recording devices. News crews, for example, will never miss a shot (even though they might not have the proper decryption key). A thief who steals a recording device adapted according to the present invention, on the other hand, will find that the device is effectively unusable in the absence of a decryption key.

As will be appreciated by one of skill in the art, embodiments of the present invention may be provided as methods, systems, or program instructions. Accordingly, the present invention may take the form of an entirely hardware embodiment, an entirely software embodiment, or an embodiment combining software and hardware aspects. Furthermore, the present invention may take the form of program code which is embodied on one or more storage media (including, but not limited to, disk storage, CD-ROM, optical storage, and so forth) which are readable by a media recording and/or playback device and which have program instructions embodied therein.

The present invention has been described with reference to flowchart illustrations and/or flow diagrams of methods, apparatus (systems), and program instructions according to embodiments of the invention. It will be understood that each block of the flowchart illustrations and/or flow diagrams, and combinations of blocks in the flowchart illustrations and/or flows in the flow diagrams, can be implemented by program instructions. These program instructions may be provided to a processor of a media recording and/or playback device to produce a machine, such that the instructions (which execute via the processor) create means for implementing the functions specified in the flowchart and/or flow diagram block(s) or flow(s).

These program instructions may also be stored in a memory that can direct a media recording and/or playback device to function in a particular manner, such that the instructions stored in the memory produce an article of manufacture including instruction means which implement the function specified in the flowchart and/or flow diagram block(s) or flow(s).

The program instructions may also be loaded onto a media recording and/or playback device to cause a series of operational steps to be performed on the device to produce a process such that the instructions provide steps for implementing the functions specified in the flowchart and/or flow diagram block(s) or flow(s). Furthermore, the instructions may be executed by more than one media recording and/or playback device.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A method of encrypting media files to deter theft, comprising steps of:
   in a media recording device that captures input streams comprising data representing at least one image, processing every input stream captured with the media recording device, prior to recording that captured input stream, by encrypting a first portion of the data that corresponds to a first portion of a physical layout of each of the at least one images and not encrypting a remaining portion of the data that corresponds to a remaining portion of the physical layout of each of the at least one images; and
   recording the captured input stream, by the media recording device as modified by the encrypting step, wherein the encryption causes subsequent playback of the recording to be degraded in the first portion of the physical layout, but not degraded in the remaining portion of the physical layout, unless the encryption can be successfully decrypted.

2. The method according to claim 1, wherein the encrypting step further comprises using shared key cryptography.

3. The method according to claim 1, wherein the encrypting step further comprises using public key cryptography.

4. The method according to claim 1, wherein the encrypting step further comprises using shared key cryptography to encrypt the first portion of the data and using public key cryptography to encrypt a symmetric key value used for the shared key cryptography.

5. The method according to claim 1, wherein the encrypting step is performed prior to the recording step.

6. The method according to claim 1, wherein the encrypting step is performed in conjunction with the recording step.

7. The method according to claim 1, wherein the encrypting step is performed while compressing the captured input stream for storage by the recording step.

8. The method according to claim 1, further comprising the step of subsequently playing back the recording, further comprising the steps of:
- decrypting, for each of the at least one images represented by the recorded input stream, the first portion of the data;
- playing back the captured input stream if the decrypting step is successful; and
- playing back, for each of the at least one images, the remaining portion of the physical layout as captured in the input stream and a distorted version of the first portion of the physical layout if the decrypting step is not successful.

9. The method according to claim 8, wherein the distorted version comprises the first portion of the physical layout overlaid by a garbled pattern.

10. The method according to claim 8, wherein the distorted version comprises the first portion of the physical layout overlaid with a filler pattern.

11. The method according to claim 1, wherein:
- the encrypting step also encrypts at least a portion of a thumbnail version of the captured input stream.

12. The method according to claim 1, wherein:
- the encrypting step also encrypts at least a portion of an audio stream captured with the media recording device; and
- the encryption causes subsequent playback of the captured audio stream to be degraded unless the encryption can be successfully decrypted.

13. The method according to claim 1, wherein the encrypting step uses a public key to encrypt a shared key and uses the shared key to encrypt the first portion of the data, and further comprising the step of subsequently playing back the recording, wherein the subsequently playing back step further comprises the steps of:
- determining if a private key corresponding to the public key is available;
- decrypting, for each of the at least one images represented by the recording, the first portion of the data if the private key is available, and playing back a result of the decryption as the first portion of the physical layout; and
- if the private key is not available, playing back, for each of the at least one images, the remaining portion of the physical layout as captured in the input stream and playing back substitute information in place of the first portion of the physical layout.

14. The method according to claim 13, wherein the decrypting step further comprises the steps of:
- using the private key to decrypt the encrypted shared key; and
- using the decrypted shared key to decrypt the encrypted first portion of the data for each of the at least one images, thereby creating the result of the decryption; and
- wherein the step of playing back substitute information further comprises the step of rendering a filler pattern in place of the first portion of the physical layout.

15. The method according to claim 14, further comprising the steps of:
- compressing the captured input stream, as modified by the encrypting step, prior to the recording step; and
- decompressing the recording when creating the result of the decryption.

16. The method according to claim 13, wherein the private key is stored in a key fob which, when operably connected to a device with which the subsequent playing back step is to be performed, makes the private key available.

17. The method according to claim 13, wherein the public key is obtained from a digital certificate and the private key is associated with the public key.

18. The method according to claim 17, wherein the public key belongs to the playback device.

19. The method according to claim 17, wherein the public key belongs to a person performing the subsequent playing back step on the playback device.

20. The method according to claim 13, wherein the private key is stored on a smart card and is made available to a device on which the subsequently playing back step is to be performed by operably connecting the smart card with a smart card reader.

21. The method according to claim 20, wherein the decrypting step is performed by the smart card.

22. The method according to claim 13, wherein the private key is stored in a cable and is made available to a device on which the subsequently playing back step is to be performed by operably connecting the cable to the device.

23. The method according to claim 13, wherein the subsequently playing back step is performed by the media recording device.

24. The method according to claim 13, wherein the private key is made available to the subsequently playing back step for a limited time, after which the private key must be re-supplied in order to be available.

25. The method according to claim 13, wherein the private key is made available from a program used to perform the subsequently playing back step.

26. The method according to claim 1, wherein the media recording device is a still-image camera.

27. The method according to claim 1, wherein the media recording device is a video camera.

* * * * *